Dec. 18, 1934.　　　T. A. DICKSON　　　1,984,362
ORE CLASSIFIER
Filed July 1, 1931　　6 Sheets-Sheet 1

Inventor
Thomas A. Dickson,
By Spear, Donaldson & Hall
Attorneys

Dec. 18, 1934.   T. A. DICKSON   1,984,362
ORE CLASSIFIER
Filed July 1, 1931   6 Sheets-Sheet 2

Inventor
Thomas A. Dickson,
By Spear, Donaldson & Hall
Attorneys

Dec. 18, 1934. T. A. DICKSON 1,984,362
ORE CLASSIFIER
Filed July 1, 1931 6 Sheets-Sheet 4

Inventor
Thomas A. Dickson,
By Spear, Donaldson & Hull
Attorneys

Patented Dec. 18, 1934

1,984,362

UNITED STATES PATENT OFFICE 1,984,362

ORE CLASSIFIER

Thomas A. Dickson, Denver, Colo., assignor to Colorado Iron Works Company, Denver, Colo., a corporation of Maine Application July 1, 1931, Serial No. 548,224

13 Claims. (Cl. 209—464)

This invention relates to improvements in method of classifying ores and the like and improvements in classifiers.

It has for its principal object increasing the capacity of a unit of a given size and at the same time improving the sharpness of the separation between the two products by an improved method of operation.

During the past few years there has been a continually increasing demand for larger and larger grinding units, particularly in ore treatment plants; and as classification in closed circuit with the grinding mills has become almost the universal practice, the demands upon the classifier have become more difficult to meet in a single machine of a size suitable for direct coupling with a grinding mill.

As a result of this the grinding-classifying operation is a compromise between the various factors such as capacity, sharpness of separation, density of the pulp, etc., and improvement of any of these factors will improve the general result.

It is well known that good separation by classification requires a relatively thin pulp and that to promote free settling in the classifier it is the custom to add a large amount of water to the mill discharge. However, pulps thin enough to classify most effectively are undesirably thin for flotation, and as a consequence the flotation must be carried out upon a pulp which is either poorly classified or too thin for best results, unless thickening after classification is resorted to.

Solids suspended in water undergo settling in such a manner that the density of the pulp as a whole as well as the size of the particles increase progressively from the surface to the bottom, and the function of a mechanical classifier is to permit the escape of the fine over a weir and by means of a reciprocating rake, chain dragged rake, or rotating helix, to remove the coarse from the pool, advance it over an upwardly inclined surface and discharge it in a drained condition.

In a classifier of the type of Patent Number 992,629 to Akins, the coarse portion, technically known as the "sands" is subjected to a rolling and plowing action whereby the moisture which drains back to the pool serves to largely free the sands from entrained fines thus returning them to the pool where they will have another opportunity to be carried over the weir. The operation of a classifier of this type moreover, is free from the surges over the weir always present in the classifiers using reciprocating rakes, and for these reasons I show and describe as preferred embodiments of my present invention a helical classifier, although it is also applicable to other types, as an example of which I show a reciprocating rake classifier.

I have chosen for illustration and description a classifier having two helixes within the same tank, and with the lower ends of the helixes deeply submerged. These features favor large capacity and high efficiency, and at the same time permit my improvements to be clearly shown in the drawings. However, I also show an application to a helical classifier having a single helix.

In the drawings, which are purely diagrammatic in character, and in which the transverse views are not true cross-sections, but are modified for the sake of clearness.

When a classifier is working well within its capacity the adjustments of speed, inclination of the machine, etc., permit of very sharp separation between the sand and slime products; but in modern practice machines are usually forced to the limit of capacity with the full range of the adjustments exhausted, thus necessarily sacrificing the quality of the work performed.

As capacity is forced, one of the first results is the increasing proportion of undesirably coarse material passing over the weir with the slime, and I have found that this is largely due to the formation and persistence of a zone within the pool near the overflow weir which I shall now proceed to describe.

It is well known that a relatively thick mixture of solids and liquid acts in a manner similar to a homogeneous liquid of high specific gravity with respect to its ability to hold bodies heavier than water in suspension. The presence of such a mixture in a classifier greatly interferes with the separation by impeding the free settling of the larger particles.

Figure 1:
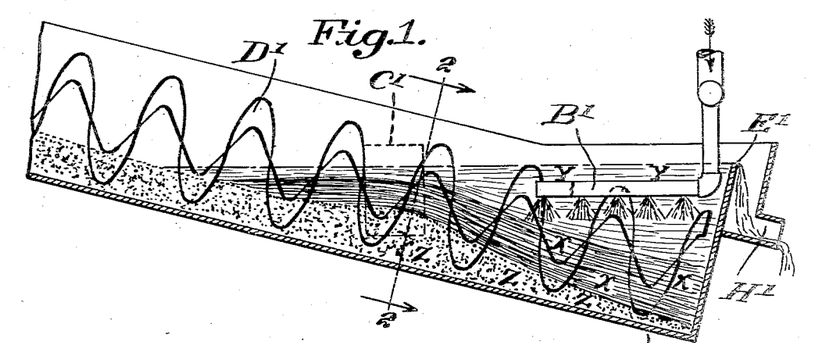
Figure 1 is a longitudinal section of one form of apparatus embodying my invention, showing pipes $B_1$ with closed ends and lateral perforations.

Referring to the drawings, Fig. 1 shows a classifier in longitudinal section, in which the feed enters at $C_1$, the finer particles are retained in the flow near the surface, represented by Y, Y, and pass over the weir, $E_1$, and the coarser particles or sands, indicated Z, Z, Z, settle to the bottom and are continuously removed by the helix $D_1$ shown diagrammatically.

When a classifier has been in operation a short time under conditions which usually accompany attempts to secure a relatively dense overflow, a zone of coarse material or "sands" forms, of a size and shape which vary with the conditions, as roughly indicated at X, X. This is the result of a thickening action, as distinguished from a classifying action. It is much denser than Y, Y, and any coarse particles or sands tending to settle from Y are retarded. The indefinite line of separation between X and Y rises until some of the coarse particles from X are carried over the weir by the general flow of Y.

Figures 2, 3, 4:
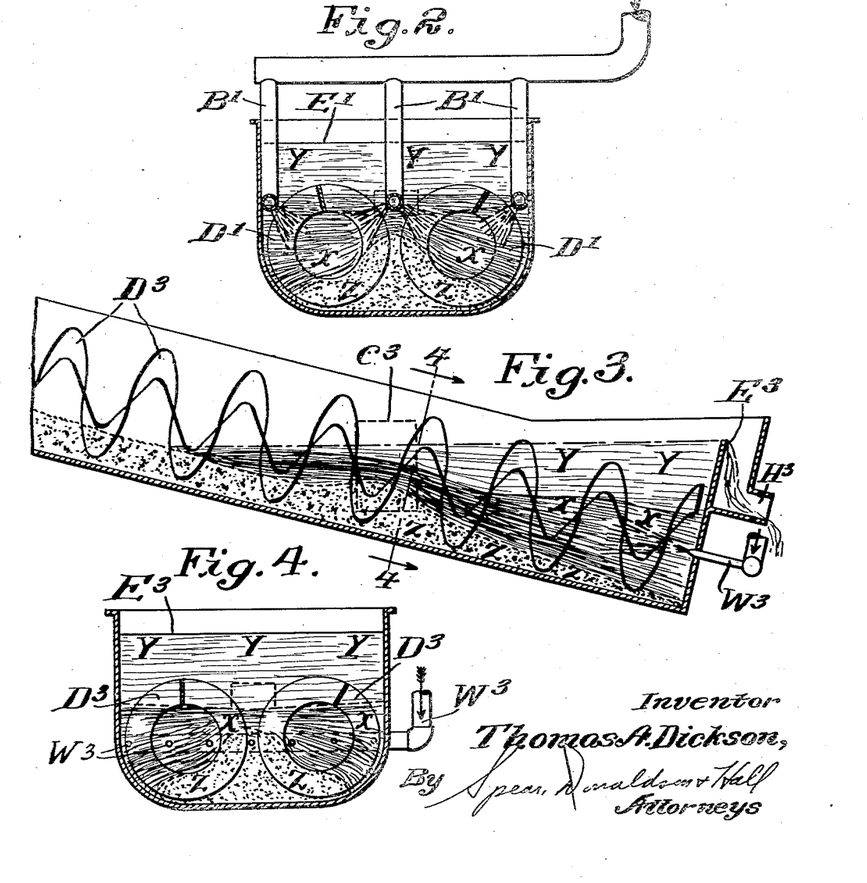
Fig. 2 is a section substantially on line 2—2 of Fig. 1.
Fig. 3 is a fragmentary view similar to Fig. 1 of a modified form of the invention, in which water is introduced through nozzles W.
Fig. 4 is a sectional view substantially on line 4—4 of Fig. 3.

My present invention consists of means for substantially eliminating the above described interfering zone, X, and this I accomplish by the introduction of water at one or more suitable points to thin the mass. Such means may be pipes as indicated at $B_1$, $B_1$, $B_1$, in Figures 1 and 2 for example, the pipes being closed at their inner ends and perforated in a suitable manner such as shown, to direct the water into the thickened pulp zone X. The water so introduced rises, carrying fine solids with it, and also thins the material so that the coarser solids can settle to the bottom. Alternatively, the water may be introduced under appropriate pressure through nozzles passing through the end wall of the tank and weir as indicated at $W_3$, $W_3$, $W_3$, in Figs. 3 and 4.

Little water is needed to keep the material in zone X sufficiently thin, and if this is taken from the water which would otherwise be added to the grinding mill discharge, no thinning of the classifier discharge as a whole takes place, but the machine is caused to make a sharper separation of a larger tonnage, and in some cases with an increase in the density of the overflow product. Nevertheless, there also are cases where the improved results warrant the thinning of the pulp by introducing water additional to that which would otherwise be supplied.

Thinning of the pulp in certain zones being what is necessary, I have found that the actual introduction of additional water can generally be avoided and a similar thinning result obtained by transferring thin pulp from one part of the classifier tank to another part where the pulp is too thick; thereby maintaining the highest possible density as a whole while maintaining locally suitable conditions for efficient separation of coarse from fine. In describing ways and means of applying such modifications of my invention I shall at the same time point out local conditions other than those described in connection with Fig. 1, and indicate how they can be corrected.

Figures 5, 6:
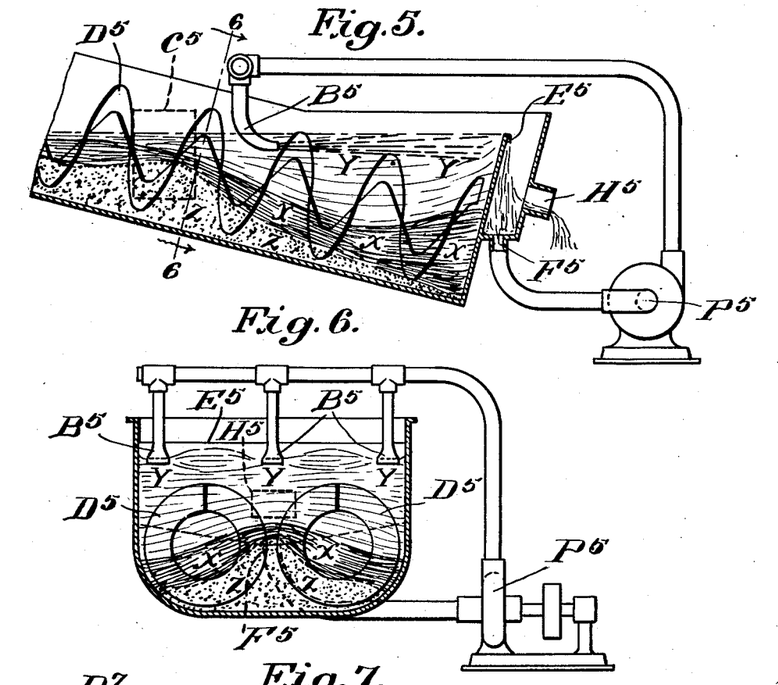
Fig. 5 is a longitudinal section of a form of my invention adapted for recirculation of a portion of the thin pulp passing over the weir.
Fig. 6 is a diagrammatic transverse view of this form, substantially on line 6—6 of Fig. 5.

Fig. 5 indicates a way of circulating thin pulp whereby the zone X, X, is kept down well below the weir, $E_5$. In this, a portion of the finished overflow product passes by means of pipe $F_5$ through the pump, $P_5$, driven by means not shown, and reenters the settling pool through jets $B_5$ directed towards the weir $E_5$, the balance of the finished overflow product passing from $H_5$. This is shown also in Fig. 6. The double helix is shown at $D_5$.

Figure 7:
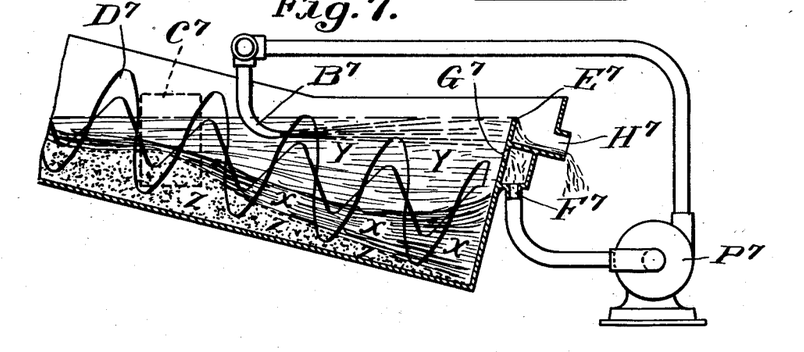
Fig. 7 is a longitudinal section of a further form of the invention in which a portion of relatively thin pulp for recirculation and thinning, is passed through the weir.

The embodiment just described has the effect of increasing the overflow over the weir by the amount of pulp circulated by the pump. Where this would be detrimental, the pump suction may be connected as indicated in Fig. 7, where the pulp is withdrawn through a slot, $G_7$, below the edge of the weir. Here there is no opportunity for the material indicated by X, X, to pass over the weir, as it is withdrawn through the slot, $G_7$, as it rises to that level, and the vertical space between the slot, $G_7$, and the edge of the weir offers a less disturbed settling zone by reason of the slower current near the surface in the part of the pool adjacent to the weir. In this case the finished overflow product passing over weir $E_7$ and discharged at $H_7$, is kept separate from the thin pulp passed through slot $G_7$, pipe $F_7$, pump $P_7$, and reintroduced through jets $B_7$. The helixes are indicated at $D_7$.

Figures 8, 10:
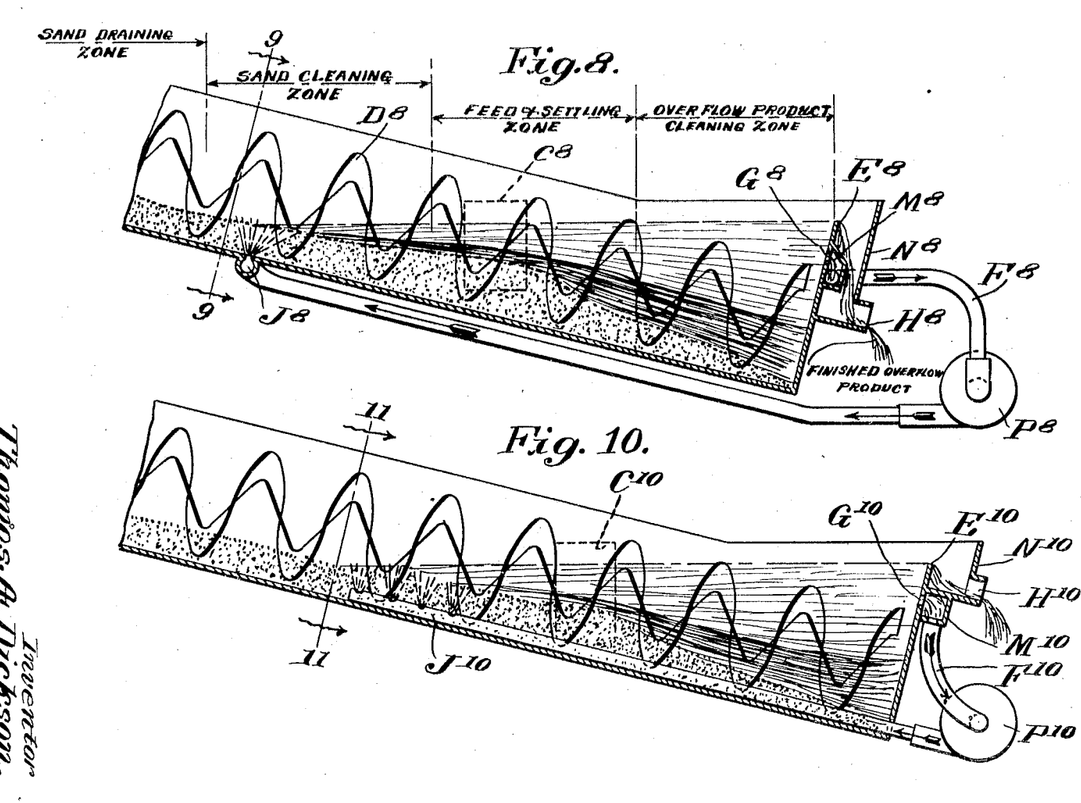
Fig. 8 shows a form similar to that of Fig. 7 in which the thin pulp is reintroduced beneath the sands near the upper end of the pool to wash out the fines and to secure sharper separation.
Fig. 10 shows a form in which the thin pulp is withdrawn through the weir and reintroduced by means of a pipe inside the tank between the helixes, as shown also in Fig. 11 which represents a transverse view substantially on line 11—11 of Fig. 10.

Fig. 8 shows a classifier with lines dividing it into sand draining, sand cleaning, feed and settling, and overflow product zones in which fairly distinct actions take place, and although these will be referred to as there indicated, it will be understood that there is no sharp line of separation between them, and also that they will vary in relative length in different cases according to the proportions of coarse and fine solids, of solids to liquid, etc.

Referring now to Fig. 8, it will be seen that in the sand cleaning zone the sand is embedded not in clear water, but in pulp, and will be discharged carrying a small amount of fine solids which should be in the overflow product.

I am aware that it is known to introduce water at this point to wash out such fines from the sand, but this is so generally objectionable that it is rarely done.

I have found that when such fines in the sand product reach an important amount it is due in great measure to the fact that the pulp separated from the sand is not free to flow toward the lower end of the classifier, but is impeded by the incoming feed, and that there is an actual increase in density (a thickening) in the pool above the feed inlet. The sand product is therefore wet with this pulp which is denser than that in the overflow product zone.

To correct the condition just described I withdraw some of the pulp from a part of the classifier where it is thinnest and re-introduce it under the sands near the upper end of the pool, whereby the sands are stirred up and washed with the relatively thin pulp, and the flow of liquid toward the weir is so increased that it does not thicken. The finally settled sand is then wet with a mixture containing less solids in proportion to water, and the said product thereby improved.

Figure 9:
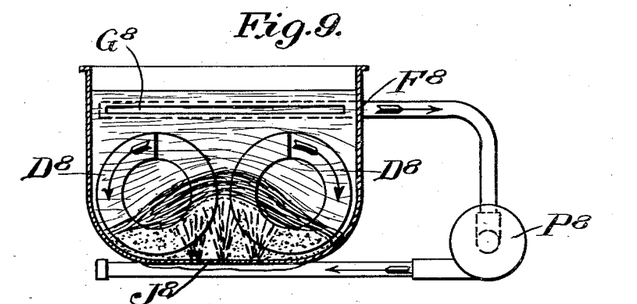
Fig. 9 is a transverse diagrammatic view substantially on line 9—9 of Fig. 8.

Fig. 8 and Fig. 9 show the thin pulp withdrawn as described in connection with Fig. 7 and introduced through the bottom of the tank by means of a perforated discharge pipe transverse to the tank as shown at $J_8$. The pulp is withdrawn through slot $G_8$ in the weir $E_8$ into a compartment $M_8$ separate from and within the chamber $N_8$ for the finished overflow product, which flows over the top of weir $E_8$ in chamber $N_8$ and out through discharge $H_8$. The withdrawn pulp in chamber $M_8$ is passed laterally through pipe $F_8$ into pump $P_8$ and thence to pipe $J_8$. Feed and helixes are indicated at $C_8$ and $D_8$.

Figure 11:
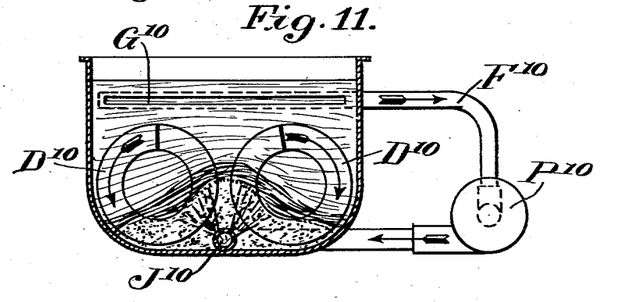

Fig. 10 and Fig. 11 show the thinning pulp withdrawn in a similar manner through the slot $G_{10}$ in the weir $E_{10}$ into separate chamber $M_{10}$, above which is disposed the finished overflow product chamber $N_{10}$ with the outlet $H_{10}$. The withdrawn thinning pulp passes from chamber $M_{10}$ through pipe $F_{10}$ to pump $P_{10}$ and is pumped through pipe $J_{10}$ longitudinally disposed between the helixes inside of the tank, and perforated as shown at its inner and upper portion to discharge the thinning pulp beneath the sands. Feed and helixes are indicated at $C_{10}$ and $D_{10}$.

Figure 12:
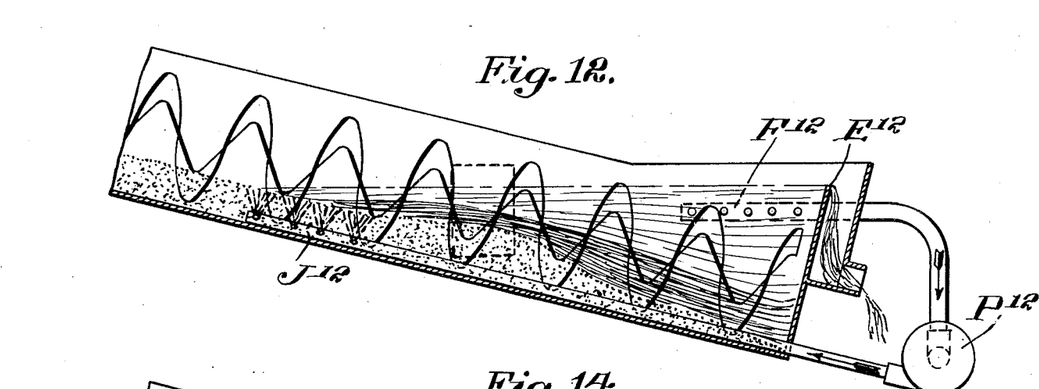
Fig. 12 shows a form in which withdrawal is effected at the side of the tank.

In Fig. 12 is shown a form in which the thinning pulp is withdrawn through the side of the tank below the top of the weir $E_{12}$ as shown by the laterally disposed openings to pipe $F_{12}$. The withdrawal is preferably effected from both sides of the tank, providing a discharge pipe $F_{12}$ at each side delivering thin pulp to the pump $P_{12}$ from which it is pumped to pipe $J_{12}$ which may be disposed in the same way as in Fig. 10.

Figure 13:
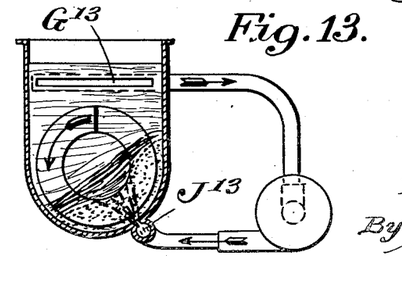
Fig. 13 is a sectional view of my invention applied to a classifier having a single helix.

Fig. 13 shows in transverse section an embodiment, similar to that shown in Fig. 8, in which the invention is applied to a classifier having a single helix with the thinning pulp withdrawn at $G_{13}$ and pumped in beneath the sands at $J_{13}$.

Figure 14:
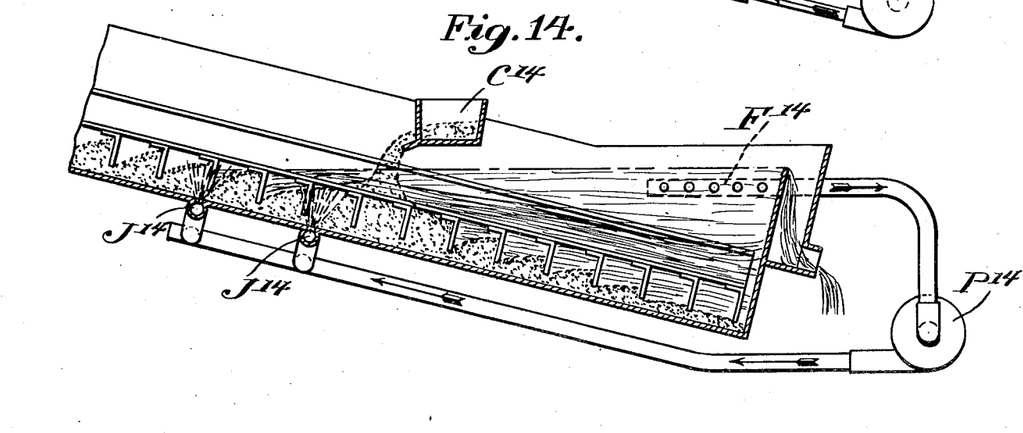
Figs. 14 and 15 show the invention applied to a reciprocating rake classifier.
Figure 15:
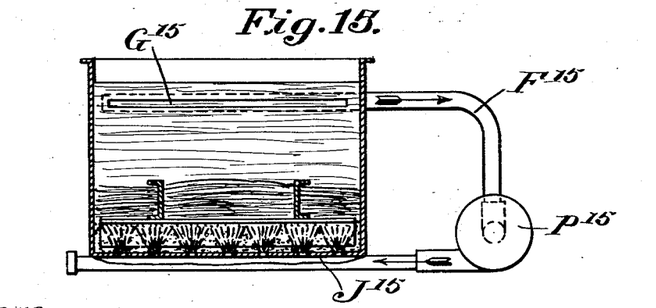

Fig. 14 shows the application of the invention to a reciprocating rake classifier, in which the pulp is withdrawn at the sides at $F_{14}$, in a manner similar to that shown in Fig. 12, and is pumped by pump $P_{14}$ to be introduced into the tank beneath the sands at points $J_{14}$ comprising lateral branch pipes provided, as shown, with discharge apertures or perforations. The application of the invention to a reciprocating rake classifier also is shown diagrammatically in transverse view in Fig. 15 which shows the slot $G_{15}$ similar to the construction of Figs. 10 and 11.

The transverse views are not true cross-sections on the lines indicated but are diagrammatically modified for the sake of clearness of operation.

Figures 16, 17:
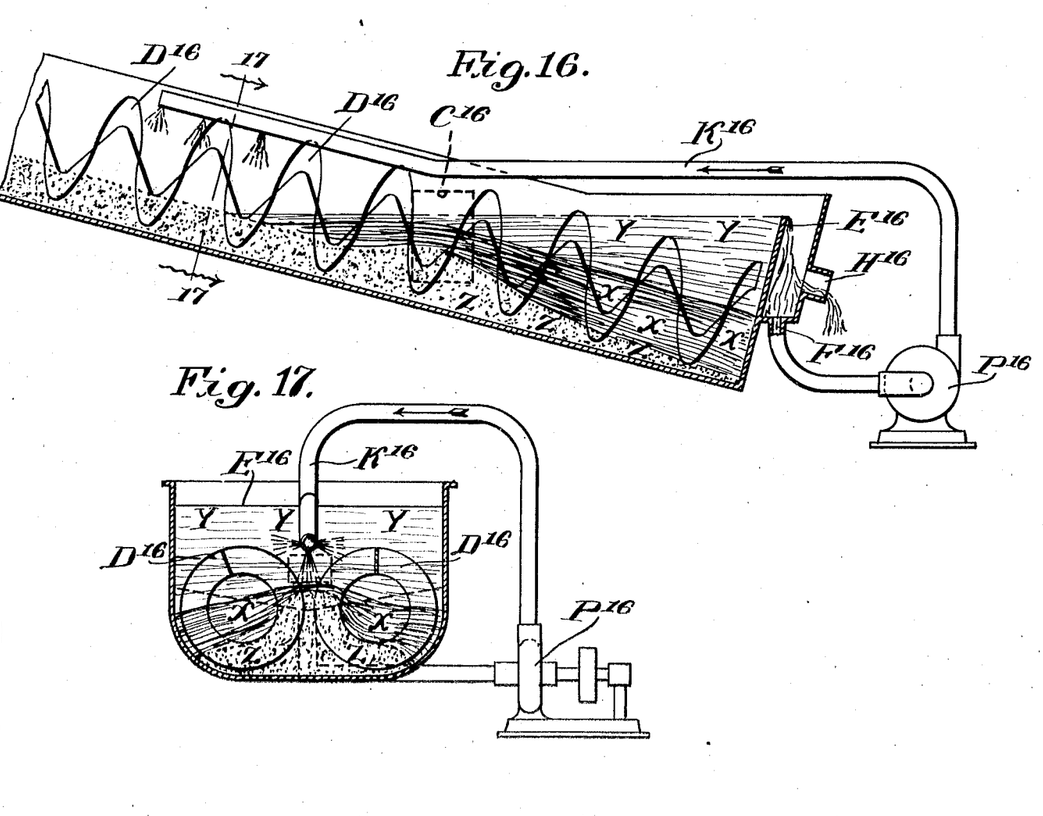
Figs. 16 and 17 are longitudinal and transverse sections of a form of the invention in which the thin pulp is reintroduced by spraying it upon the sand at the emergence of the sand from the pool.

Fig. 16 shows a form of the invention in which the thin pulp passes over weir $E_{16}$ and is discharged at $H_{16}$, a portion thereof being drawn off at $F_{16}$ and passing through pump $P_{16}$ to pipe $K_{16}$ which is extended upwardly and to a position overlying the sands at the point of emergence of the sands from the pool, at which point it is provided with openings or perforations, as shown, re-introducing the thin pulp into the tank by spraying it upon the emerged sands.

Fig. 17 is a transverse view substantially on line 17—17 of Fig. 16, embodying the essential structure and idea of Fig. 16. In Figs. 16 and 17 the helixes are indicated at $D_{16}$.

It will be understood that the various modifications of my improvements illustrated and described herein may be combined; as by the embodiment of both those shown in Fig. 5 and Fig. 8 in the same machine. It will be apparent to those skilled in the art how my improved features and method of operating may be applied to chain drag classifiers or other mechanical classifiers without specific descriptions and drawings of such applications.

It will be understood that where, for simplicity of illustration, the perforations in the pipes are shown as opening upwardly for the upward discharge of the thin pulp or liquid into the tank, the invention is not restricted to the upward disposition of the perforations or openings in the pipes. It will be apparent that the pipes may be readily arranged with respect to the tank, so that the perforations or openings face laterally or downwardly as the thin liquid, regardless of the direction of its discharge from the pipes, i. e. whether upwardly or downwardly, will rise through the sand immediately and accomplish the desired effect.

The larger the amount of thin pulp withdrawn and reintroduced the greater will be the velocity of the pulp passing through the overflow product cleaning zone, and control of the quantity of pulp so recirculated provides additional means of regulating the fineness of the particles which will pass over the weir, a relatively coarse overflow product being produced when the volume is large. My invention thus not only improves the separation made by a classifier, but extends the range within which the separation may be made.

All of the foregoing is directed particularly to mechanical classifiers as distinguished from cones, spitzkasten and similar apparatus also widely used for classification. Nevertheless, my present invention is also applicable to the latter so-called hindered settling classifiers by withdrawing thin pulp from such classifier or from the overflow thereof and utilizing it as the sorting current either wholly or with some water, with avoidance of the excessive thinning of the pulp which necessarily results when such classifiers are operated with water as heretofore.

It will be understood that where in the above description or in the drawings, a feature disclosed in connection with one form of the invention is susceptible of use with other forms illustrated, said feature is to be regarded as though particularly disclosed in connection with the said other forms.

I claim:

1. In combination in a continuous classifier, a tank providing a substantially quiescent pool, means for continuously feeding pulp into said quiescent pool, means for continuously removing the settled solids, a weir for continuously overflowing a fine product comprising liquid with suspended solids from said pool, and means for withdrawing thin pulp and reintroducing it into said substantially quiescent pool, said withdrawn thin pulp comprising a portion of the overflow over said weir, a receptacle beyond said weir to receive the overflow from said weir, said receptacle having an outlet in its wall for the discharge of the overflow product, and a second outlet for withdrawing said thin pulp to be reintroduced into said pool.

2. In combination in a continuous classifier, a tank providing a substantially quiescent pool, means for continuously feeding pulp into said quiescent pool, means for continuously removing the settled solids, a weir for continuously overflowing a fine product comprising liquid with suspended solids from said pool, and means for withdrawing thin pulp and reintroducing it into said substantially quiescent pool, said withdrawn thin pulp comprising a portion of the overflow over said weir, a receptacle beyond said weir to receive the overflow from said weir, said receptacle having an outlet in its wall for the discharge of the overflow product, and a second outlet for withdrawing said thin pulp to be reintroduced into said pool, a conduit from said second outlet passing upwardly over the top of the walls of said tank and extending beneath the surface of the pool, said conduit being provided with a discharge nozzle beneath the surface and directed toward the weir or discharge end of the classifier to keep down the interfering thickened zone of pulp.

3. In combination in a continuous classifier, a tank providing a substantially quiescent pool, means for continuously feeding pulp into said quiescent pool, means for continuously removing the settled solids, a weir for continuously overflowing a fine product comprising liquid with suspended solids from said pool, and means for withdrawing thin pulp and reintroducing it into said substantially quiescent pool, said withdrawn thin pulp comprising a portion of the overflow over said weir, a receptacle beyond said weir to receive the overflow from said weir, said receptacle having an outlet in its wall for the discharge of the overflow product, and a second outlet for withdrawing said thin pulp to be reintroduced into said pool, a conduit from said second outlet passing upwardly over the top of the walls of said tank and discharging downwardly into the tank.

4. In combination in a continuous classifier, a tank providing a substantially quiescent pool, means for continuously feeding pulp into said quiescent pool, means for continuously removing the settled solids, a weir for continuously overflowing a fine product comprising liquid with suspended solids from said pool, and means for withdrawing thin pulp and reintroducing it into said substantially quiescent pool, said weir being provided with an opening therethrough below the upper edge thereof for withdrawing said thin pulp to be reintroduced into said pool, a receptacle beyond said weir to receive said overflow, said receptacle having a discharge outlet, and a separate receptacle for said thin pulp withdrawn through said opening in the weir.

5. In combination in a continuous classifier, a tank providing a substantially quiescent pool, means for continuously feeding pulp into said quiescent pool, means for continuously removing the settled solids, a weir for continuously overflowing a fine product comprising liquid with suspended solids from said pool, and means for withdrawing thin pulp and reintroducing it into said substantially quiescent pool, said weir being provided with an opening therethrough below the upper edge thereof for withdrawing said thin pulp to be reintroduced into said pool, a receptacle beyond said weir to receive said overflow, said receptacle having a discharge outlet, and a separate receptacle for said thin pulp withdrawn through said opening in the weir, said separate receptacle being disposed below said first named receptacle and outlet for the overflow.

6. In combination in a continuous classifier, a tank providing a substantially quiescent pool, means for continuously feeding pulp into said quiescent pool, means for continuously removing the settled solids, a weir for continuously overflowing a fine product comprising liquid with suspended solids from said pool, and means for withdrawing thin pulp and reintroducing it into said substantially quiescent pool, said weir being provided with an opening therethrough below the upper edge thereof for withdrawing said thin pulp to be reintroduced into said pool, a receptacle beyond said weir to receive said overflow, said receptacle having a discharge outlet, and a separate receptacle for said thin pulp withdrawn through said opening in the weir, said separate receptacle being disposed within said first named receptacle and above the outlet for the overflow.

7. In combination in a continuous classifier, a tank providing a substantially quiescent pool, means for continuously feeding pulp into said quiescent pool, means for continuously removing the settled solids, a weir for continuously overflowing a fine product comprising liquid with suspended solids from said pool, and means for withdrawing thin pulp said weir having an opening therethrough below the upper edge thereof for withdrawing said thin pulp, a receptacle beyond said weir to receive said overflow, said receptacle having a discharge outlet, a separate receptacle for said thin pulp withdrawn through said opening in the weir, said receptacle comprising a conduit extending along said tank and discharging said thin pulp into the sands at the point of emergence of the sands from the pool.

8. A classifier according to claim 7 in which said separate receptacle is disposed within said first named receptacle, and above the outlet for the said overflow, said conduit extending longitudinally of the tank and providing a portion extending transversely against the bottom of the tank within the sand cleaning zone and provided with an opening disposed to discharge into the tank, the bottom of said tank being provided with an opening receiving the discharge from said conduit.

9. A classifier according to claim 7 in which said separate receptacle is disposed below said first named receptacle and outlet for the said overflow, said conduit extending into the tank through the weir and extending along the bottom of the tank centrally thereof and inside the tank, said classifier having a pair of coextensive helixes and said conduit being disposed between said helixes.

10. In combination in a continuous classifier, a tank providing a substantially quiescent pool, means for continuously feeding pulp into said quiescent pool, means for continuously removing the settled solids, a weir for continuously overflowing a fine product comprising liquid with suspended solids from said pool, and means for withdrawing thin pulp and reintroducing it into said tank, said means for withdrawing thin pulp including a conduit to receive said withdrawn thin pulp, said conduit extending along said tank and discharging said thin pulp into the sands at the point of emergence of the sands from the pool, to wash the fines from the sands and to return the fines to the pool said conduit extending into the tank through the end wall thereof at the fine discharge end of the tank, and extending along the bottom of the tank centrally thereof and inside the tank, said classifier having a pair of coextending helixes and said longitudinally extending conduit being disposed between said helixes.

11. In combination in a continuous classifier, a tank providing a substantially quiescent pool, means for continuously feeding pulp into said quiescent pool, means for continuously removing the settled solids, a weir for continuously overflowing a fine product comprising liquid with suspended solids from said pool, and means for withdrawing thin pulp and reintroducing it into said tank, said means for withdrawing thin pulp including a conduit to receive said withdrawn thin pulp, said conduit extending along said tank and discharging said thin pulp into the sands at the point of emergence of the sands from the pool, to wash the fines from the sands and to return the fines to the pool said tank being provided with a discharge opening for the thin pulp in its side wall disposed laterally of the weir, said conduit being in communication with said opening.

12. In combination in a continuous classifier, a tank providing a substantially quiescent pool, means for continuously feeding pulp into said quiescent pool, means for continuously removing the settled solids, a weir for continuously overflowing a fine product comprising liquid with suspended solids from said pool, and means for withdrawing thin pulp and reintroducing it into said tank, said means for withdrawing thin pulp including a conduit to receive said withdrawn thin pulp, said conduit extending along said tank and discharging said thin pulp into the sands at the point of emergence of the sands from the pool, to wash the fines from the sands and to return the fines to the pool the opposite side walls of the tank adjacent the weir being provided with discharge openings for the thin pulp disposed laterally of the weir, said conduit being in communication with said openings.

13. In combination in a continuous classifier, a tank providing a substantially quiescent pool, means for continuously feeding pulp into said quiescent pool, means for continuously removing the settled solids, a weir for continuously overflowing a fine product comprising liquid with suspended solids from said pool, and means for withdrawing thin pulp and reintroducing it into said substantially quiescent pool, a receptacle beyond said weir to receive the said overflow, said receptacle having an upper outlet in its wall for the discharge of the overflow product, and a lower outlet for withdrawing a portion of the thin pulp of the overflow, said weir having an opening therethrough below its upper edge for the passage of thin pulp, and conducting means including a conduit receiving the discharge from said weir opening and delivering it through the bottom of said tank into the sands at the sand cleaning zone to wash out the fines, and a conduit receiving the discharge from said lower opening and delivering it through the top of the tank into the top of the pool to thin the interfering zone of thickened pulp near the fine discharge end of the tank.

THOMAS A. DICKSON.